Figure 1:
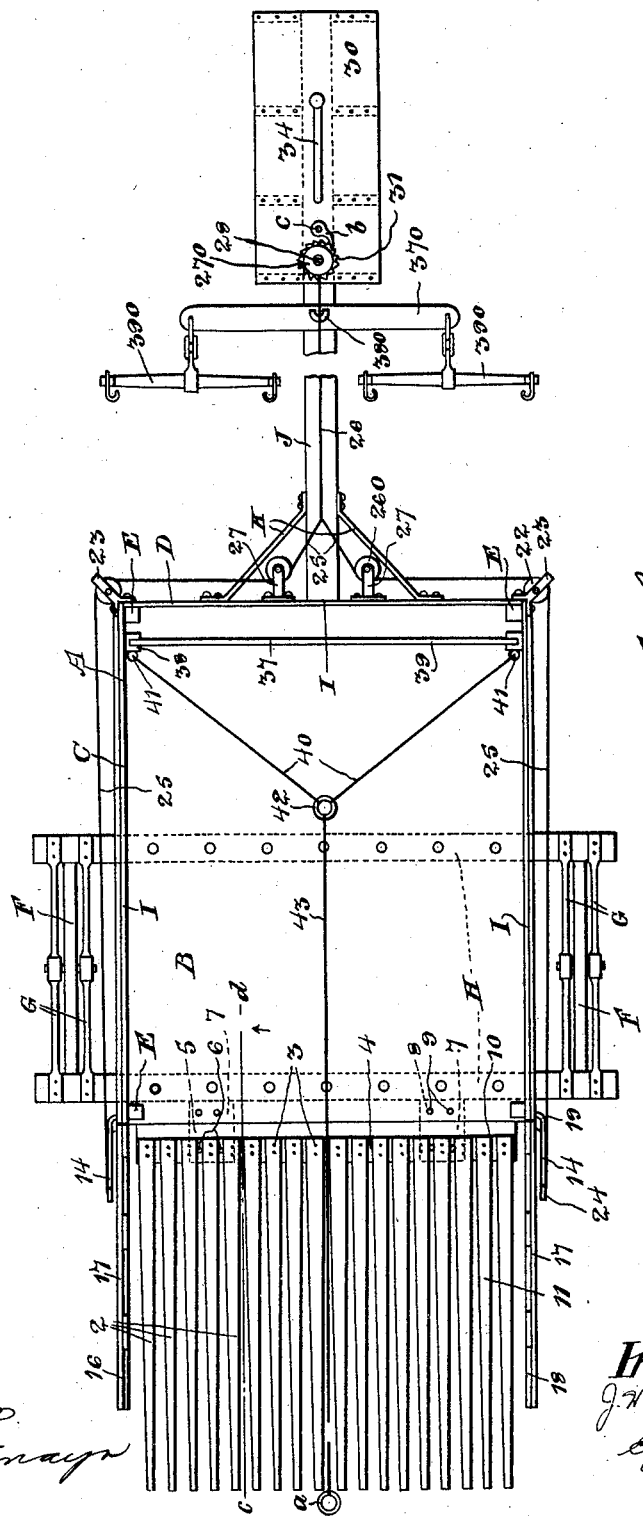

J. H. HAUSER.
SHEAF LOADER AND UNLOADER.
APPLICATION FILED SEPT. 3, 1912.

1,058,969.

Patented Apr. 15, 1913.
2 SHEETS—SHEET 1.

Witnesses.
Inventor.

J. H. HAUSER.
SHEAF LOADER AND UNLOADER.
APPLICATION FILED SEPT. 3, 1912.
1,058,969.
Patented Apr. 15, 1913.
2 SHEETS—SHEET 2.
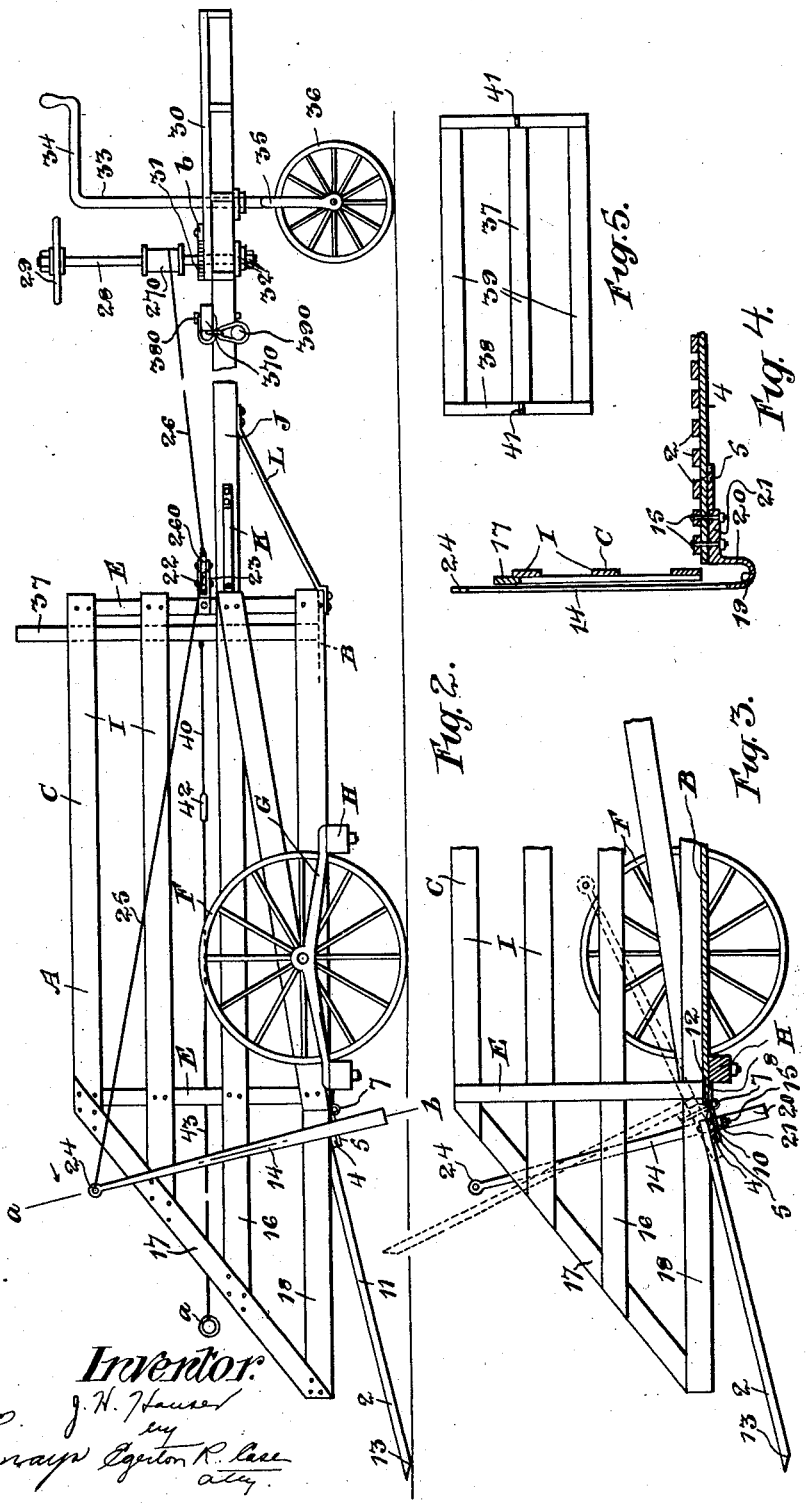

UNITED STATES PATENT OFFICE.

JOHN HENRY HAUSER, OF KILLAM, ALBERTA, CANADA, ASSIGNOR OF ONE-HALF TO FRANCIS EDWARD NICHOL, OF KILLAM, ALBERTA, CANADA.

SHEAF LOADER AND UNLOADER.

1,058,969. Specification of Letters Patent. Patented Apr. 15, 1913.

Application filed September 3, 1912. Serial No. 718,308.

*To all whom it may concern:*

Be it known that I, JOHN HENRY HAUSER, farmer, a British subject, residing at Killam, in the Province of Alberta, Canada, have invented certain new and useful Improvements in Sheaf Loaders and Unloaders, of which the following is a specification.

My invention relates to improvements in sheaf loaders and unloaders, and the object of my invention is to provide an implement whereby the sheaves are loaded direct from the shock and hauled to the threshing machine, and there unloaded, without the sheaves being handled by the operator.

Other objects of my invention are to construct my implement as light as possible, and to cheapen cost of production thereof, without sacrificing strength and utility, and, my implement, broadly considered, comprises a vehicle box mounted on suitable running gear, the front end of the box being open, and a loader hinged thereto, and provided with means controlled by the operator for raising and lowering the same, a suitable unloader being mounted within said vehicle box whereby the sheaves are unloaded at the desired point, as hereinafter more particularly set forth.

Figure 1 is a plan view of my preferred form of implement. Fig. 2 is a side elevation of the implement. Fig. 3 is a vertical longitudinal section through the front portion of my implement, on the line $c$—$d$, Fig. 1. Fig. 4 is a cross section on the line $a$—$b$, Fig. 2, transversely through portion of the front end of my implement, and Fig. 5 is a side elevation of a suitable form of unloader.

In the drawings, like characters of reference indicate corresponding parts in each figure.

As is well known, sheaves of grain are now individually tossed by a laborer from the shock to another laborer mounted on a grain wagon, who in turn builds the load. The loaded grain wagon is then driven to the threshing machine and there unloaded. The operation just described consumes a considerable amount of time, and also requires more than one laborer. Now, by means of my invention, only one laborer is required, to collect the sheaves from the shock; cart them to the threshing machine, and there unload them. The operator lowers the loader at the front of the implement so that it slides along the ground under the sheaves of the shock. This operation is continued from shock to shock until the implement is full, when the loader is operated to close the front of the implement to prevent the sheaves from falling therefrom, and the implement is then driven to the threshing machine and there unloaded as hereinafter particularly set forth.

A is the vehicle-box, and the same is composed of a suitable floor B and the side railings C and rear railing D, which are connected to the corner posts E. The vehicle-box is mounted on two wheels, supported by any suitable gear. According to the construction shown, the wheels F are positioned between and are journaled each in a pair of cross bars G, which cross bars are suitably secured to the cross bars H carried by the vehicle-box. The said wheels are positioned one on each side of the said box A, and are so mounted that the implement will operate the required distance above the ground in order to give the best results. The said railings are preferably constructed of horizontal bars I, spaced apart, so as to make the implement light in weight.

J is the tongue, and the same is secured to the vehicle-box A by any suitable means, (not particularly shown, as the securing of the tongue to my vehicle forms no part of my invention).

K are side braces for the tongue, and the same are carried by one of the horizontal bars I of the rear railing D.

L is a supporting brace for the tongue, and the same is suitably connected to the box A.

The sheaf loader is preferably constructed of a plurality of slats 2, spaced apart, and the same are secured by any suitable means, such as screws or nails 3, at their inner ends, to the cross bar 4. This cross bar is in turn secured to the leaves 5, by any suitable fastening means, such as screws 6, of the hinges 7, and the leaves 8 of these hinges are secured by any suitable means, such as screws 9, to the floor B, and against the underside thereof. Of course any suitable means may be used for hinging the sheaf loader to the box A, as will be understood. The inner upper corner 10 of the cross bar 4 is beveled, so that the sheaf loader 11 may be moved into the position illustrated by dotted lines in Fig. 3. The removal of the said corner prevents the cross bar 4 from jamming against the front edge 12 of the floor B and interfering with the movement of the said sheaf loader. The free ends of the slats 2 are preferably beveled on their undersides as shown at 13, so that the said slats will ride freely on the surface of the ground.

Secured to the loader 11, and one on each side thereof, are a pair of levers 14. These levers, as will be seen upon referring to Figs. 1 and 2, are positioned at each side of the box 3, and they are secured by any suitable means such as nuts and bolts designated by the common numeral of reference 15, to each end of the cross bar 4. The side railings C are provided each with an extension 16, which extensions are formed by the side horizontal bars I, and the forward ends of these said horizontal bars are connected together in their associated relationship, by the railings 17. When the sheaf loader 11 is tilted into the position illustrated by dotted lines in Fig. 3, the levers 14 must not conflict with the bottom horizontal bars 18, and in order to avoid conflict between these parts, each of the said levers 14 is provided with a curved neck 19 which is connected by an extension 20 to the foot 21 which is secured by the nuts and bolts 15 to the cross bar 4. The extensions 20 and the necks 19 position the levers 14 on the outer side of the extensions 16, and the curved necks 19 of each of the said levers permit the same to be moved into the dotted position illustrated in Fig. 3 without conflicting with the bottom horizontal bars 18.

22 are a pair of pulleys mounted in suitable brackets 23, and these brackets are suitably secured to the rear corner posts E. Each lever 14 is preferably provided at its outer end with an eye 24, and secured in each of these eyes is a rope or cable 25. These ropes are passed over the pulleys 22 and behind the pulleys 260 mounted in the brackets 27 suitably secured to one of the bars I of the rear railing D. These ropes or cables 25 are connected to a rope or cable 26 which is secured to the drum 270 keyed to the axle 28. This axle is provided with a hand-wheel 29, and it is held in the tongue J.

30 is a platform carried by the tongue J, and suitably secured thereto, and keyed to the axle 28 is a ratchet wheel 31, which rests upon the top of the platform 30.

$b$ is a dog pivoted at $c$ to the platform 30. The dog $b$ locks the drum 270, through the medium of the ratchet wheel 31, to prevent backward rotation of this drum when the rope or cable 26 is wound therearound.

Carried by the lower end of the axle 28 are washers and a nut designated by the common numeral of reference 32, which retain the said axle in the said tongue.

33 is a steering rod provided with a handle 34. The rod 33 has bearing, after any suitable construction not necessary to illustrate, in the platform 30, and journaled in the bifurcated end 35 of the said steering rod, is a steering wheel 36. The sheaf unloader comprises a frame 37, which is preferably composed of a pair of vertical posts 38 which are connected together by the horizontal bars 39, spaced apart for the purpose of lightness in construction. The normal position of the frame 37 is with the posts 38 against the posts E at the rear railing D.

370 is a double tree pivoted by the kingbolt 380 to the tongue J, and 390 are the swingle trees which are coupled one at each end of the double tree.

Having now particularly described the chief parts of my implement, I shall now describe its operation.

The horses are of course hitched to the swingle trees 390, and their heads are behind the rear railing D. The sheaf unloader is in normal position, and the sheaf loader 11 is in the position indicated in full lines in the drawings, when the implement is ready for use. The operator stands on the platform 30, and by means of the wheel 36, he steers the implement as the same is pushed forward by the horses. During the advance of the implement, the slats 2 of the sheaf loader 11 slide underneath the sheaves in the shock, and as the implement continues in this movement, the said sheaves in time fill the box A. The operator then rotates the drum 270 by means of the handwheel 29 and axle 28, thereby winding the cable or rope 26 around the said drum, thus moving the arms or levers 14 into the dotted position shown in Fig. 3, and the sheaf loader 11 into the position illustrated in dotted lines in this said figure, thus closing the front end of the box A and so preventing the sheaves from falling therefrom. The implement is then driven over to the place where it is desired to unload the sheaves. The operator will then lower the sheaf loader 11 by means of the hand-wheel 29 and its connected parts, and, by means hereinafter described, the sheaf unloader or frame 37 is coupled to a fixed object. The horses are then moved around to face away from the box A, and are driven forward thus pulling the implement with them. Since the sheaf unloader or frame 37 is stationary, it will cause the sheaves in the box A to pass out of said box and on to the loader 11 down whence they slide to the ground. When the front posts E abut against the eye bolts 41 of the frame 37, the box is of course empty. After the operation of unloading, the sheaf loader or frame 37 is uncoupled from the fixed object and is then placed back in position. The horses will then be swung around to face the implement, and the same is ready for use.

40 are ropes or cables which are connected to eye bolts 41 carried by the posts 38, preferably extending beyond the forward side of the said posts, and positioned substantially midway their height. The ropes or cables 40 are connected to a coupling ring 42, and 43 is a rope or cable connected to the ring 42, and provided at its outer end with any suitable coupling means, such as a ring $a$. The ropes or cables 40 hang down loose, and the rope or cable 43 of course normally rests loose on the floor B, and the forward portion thereof passes over the cross bar 4 between two of the slats 2 and trails on the ground when the implement is being loaded. In order to secure the sheaf unloader or frame 37 from movement when the implement is being unloaded, the coupling means $a$ (which of course extends the desired distance beyond the loader 11), is coupled to an anchored cable or other fixed means (not shown) so that the said sheaf unloader will coact with the implement as before set forth.

The extensions 16 and their associated railings 17, prevent the sheaves from falling sidewise off the loader 11 when the implement is being filled.

In place of the handle 34, a seat may be provided for the operator, but this forms no part of my invention.

This implement of course may be used for loading and unloading other suitable farm products.

The angular position of the slats 2 in respect of the floor B will be such as to permit the sheaves to readily pass thereover into the cart body or box A.

Of course I may operate my implement by motive power, and I do not confine myself to using horses.

While I have described what I consider to be the best embodiment of my invention, I desire it to be understood that the principles can be embodied in different forms and I desire not to be limited beyond the requirements of the prior art and the terms of my claims.

What I claim as my invention is:

1. An implement of the class described comprising a vehicle-box having an open front; a tongue carried by said box and projecting beyond the rear end thereof; suitable running gear for said box; a steering wheel carried by said tongue; a loader hinged at the front end of said box and designed to be shoved in front thereof in lowered position, in order that the implement may be loaded; a pair of levers attached to said loader and one at each side thereof; a drum mounted on an axle carried by said tongue; means for locking said drum and its axle from backward movement, and flexible members connecting said levers with said drum, said drum controlling the movement of said loader, at the will of the operator, through the medium of said levers and said flexible members.

2. An implement of the class described comprising a vehicle box having forwardly placed side extensions and having an open front; a tongue carried by said box and projecting beyond the rear end thereof; suitable running gear for said box; a loader comprising a cross bar hinged to the front end of the floor of said box; a plurality of slats secured at their inner ends to cross bar, and projecting therebeyond and normally occupying a downward-backward angle; a lever secured to each end of the said cross bar and positioned outside of said extensions and provided each with a curved neck which is positioned underneath said extensions; a drum mounted on an axle carried by said tongue; means for locking said drum and its axle from backward movement, and flexible members connecting said levers with said drum, said drum controlling the movement of said loader, at the will of the operator, through the medium of said levers and said flexible members.

3. An implement of the class described comprising a vehicle box having forwardly placed side extensions and having an open front; a tongue carried by said box and projecting beyond the rear end thereof; suitable running gear for said box; a steering wheel carried by said tongue; a loader comprising a cross bar hinged to the front end of the floor of said box; a plurality of slats secured at their inner ends to said cross bar, and projecting therebeyond and normally occupying a downward-backward angle; a lever secured to each end of said cross bar and positioned outside of said extensions and provided each with a curved neck which is positioned underneath said extensions; a drum mounted on an axle carried by said tongue; flexible members connecting said levers with said drum; pulleys carried by said box against which said flexible members operate, and means for locking said drum and its axle from backward movement.

In testimony whereof I have affixed my signature in presence of two witnesses.

JOHN HENRY HAUSER.

Witnesses:
F. E. NICHOL,
GEORGE D. WRIGHT.

Copies of this patent may be obtained for five cents each, by addressing the "Commissioner of Patents, Washington, D. C."